Inventor
J. G. Rankin
By Mawhinney & Mawhinney
Attorneys.

July 30, 1946.　　　　J. G. RANKIN　　　　2,404,812
DEVICE FOR ATOMIZING CERTAIN CHEMICALS AND OILS FOR
THE PRODUCTION OF DRY OIL STEAM FOR SIGNALING
Filed April 19, 1941　　　2 Sheets-Sheet 2
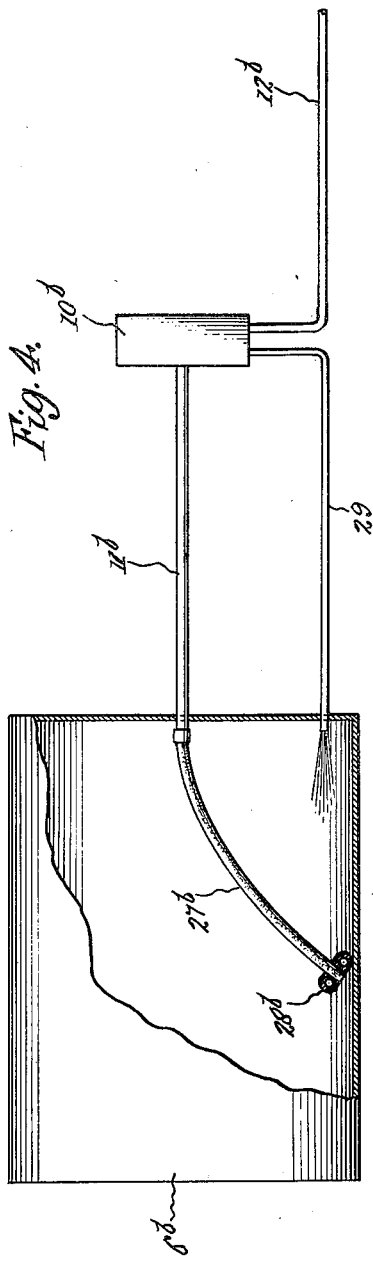
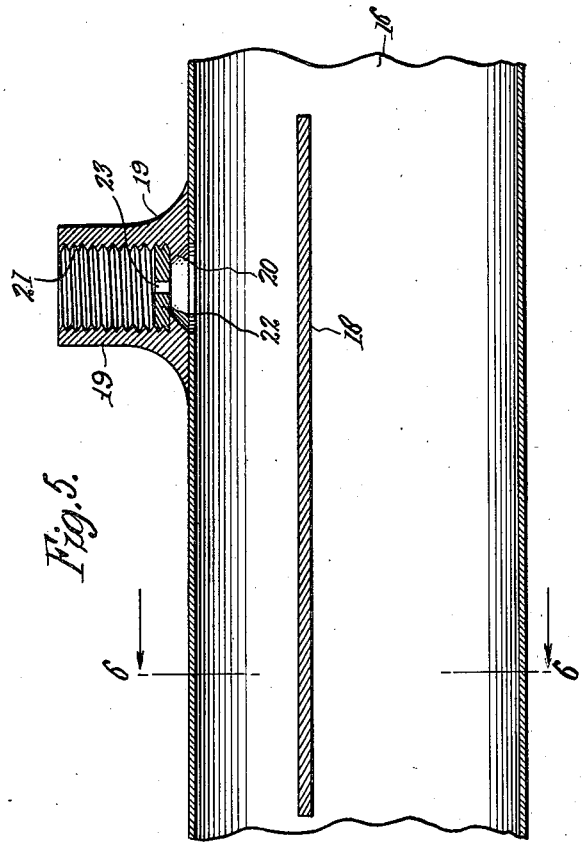
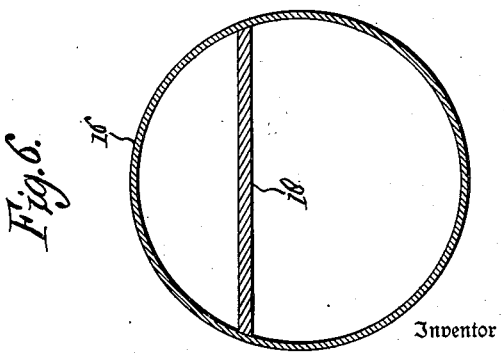
Inventor
J. G. Rankin
By Mawhinney & Mawhinney
Attorneys.

Patented July 30, 1946

2,404,812

UNITED STATES PATENT OFFICE 2,404,812

DEVICE FOR ATOMIZING CERTAIN CHEMICALS AND OILS FOR THE PRODUCTION OF DRY OIL STEAM FOR SIGNALING

John G. Rankin, Tulare, Calif.

Application April 19, 1941, Serial No. 389,476

12 Claims. (Cl. 40—127)

The present invention relates to a device for atomizing certain chemicals and oils for the production of dry oil steam for signaling.

More specifically the invention relates to that art known quite generally as "sky writing," and consists in certain improvements in this art, both mechanical and chemical, in which the art is generally improved for commercial purposes and more particularly for use in connection with signaling as proposed to be practiced in both aerial and surface warfare.

An object of the invention is to improve the construction of devices for atomizing chemicals and oils for the production of an improved dry oil steam.

Another object of the invention is to improve the form of tank for holding the chemicals or oils, situating it favorably upon the plane to take the best advantage of its construction, and in equipping the tank to extract substantially all of the chemicals or oils therefrom despite the position of the plane incident to acrobatic manœuvres.

A further object of the invention is to provide an improved exhaust pipe section equipped with a "hot plate" and with an injection device located with reference to the "hot plate" to direct the chemicals or oils thereupon to secure atomization.

A still further object of the invention resides in providing an improved chemical formula for producing a colored smoke.

With the foregoing and other objects in view, the invention will be more fully described hereinafter, and will be more particularly pointed out in the claims appended hereto.

In the drawings, wherein like symbols refer to like or corresponding parts throughout the several views:

Figure 4 is a diagrammatic view of the chemical or oil tank, pump and piping arrangement.

Figure 5 is a fragmentary cross sectional view of a portion of the exhaust pipe showing the "hot plate" and the injection jet, and Figure 6 is a cross section taken on the line 6—6 of Figure 5.

Figure 1:
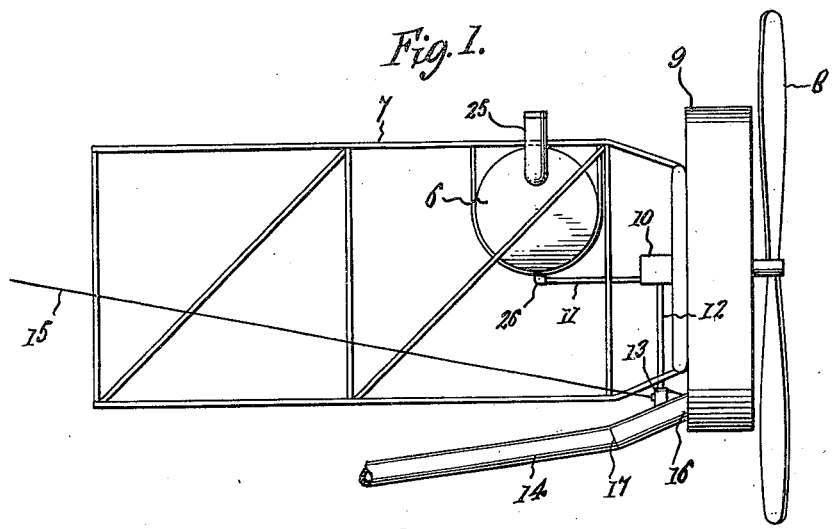
Figure 1 is a fragmentary side elevation of a conventional form of airplane showing the improved device applied thereto.

Referring more particularly to the drawings, in Figure 1, 6 designates a tank for the chemical solution or the oils which is mounted upon an airplane 7 represented conventionally, of which 8 is the propellor and 9 the engine cowl.

The chemicals or oils are drawn from the tank 6 by a pump 10 through a pipe line 11 and circulated by a pipe line 12 to an injection valve 13 adjacent the exhaust pipe 14 of the motor. The injection valve 13 is under the control of a cable 15 which extends to the pilot's cockpit. The manifold section to which the injection valve 13 is connected is indicated at 16 and is shown more particularly in Figure 5. A suitable joint 17 is made between the sections of the manifold pipe.

Referring more particularly to Figure 5 in the exhaust pipe section 16 is located a "hot plate" 18, dimensioned as hereinafter more fully described and extending across the exhaust pipe in its lateral dimension in a plane preferably offset from the diameter of the exhaust pipe toward the jet of the injection valve 13. As to length or long axis, the hot plate 18 extends substantially parallel with the axis of the exhaust pipe and is necessarily offset therefrom due to its lack of coincidence with the diameter of the exhaust pipe. A nipple 19 carried by the exhaust pipe section 16 is arranged with its axis transverse to the axis of the exhaust pipe 16, such nipple being internally shouldered at 20 and internally threaded at 21. The shoulder 20 forms a stop for a jet disc or wafer 22 having a central perforation 23 of desired port area. A number of discs 22 having various sized ports 23 may be interchangeably used in connection with the device to suit various requirements and various oils, chemicals and mixtures of the same. The injection valve 13 may be screwed into the threads 21 of nipple 19 or otherwise coupled to such nipple 19.

Figure 2:
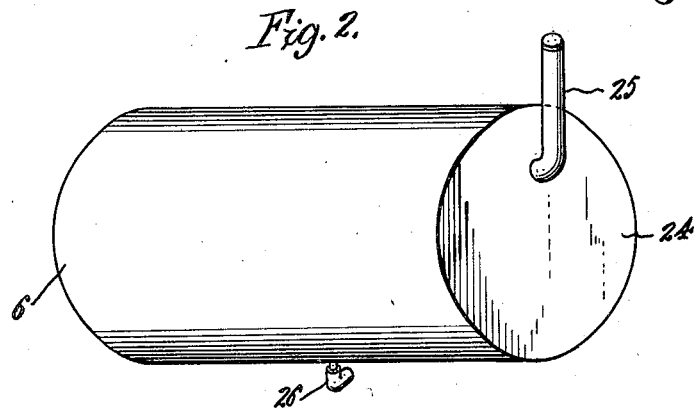
Figure 2 is a perspective view of an improved form of tank for the chemicals or oils which is suitable for non-acrobatic flying.

Referring more particularly to Figure 2, the tank 6 is of a form suitable for non-acrobatic flying. This tank has a tubular body with flat ends 24, a vented filler cap 25 and an off-take elbow 26.

Figure 3:
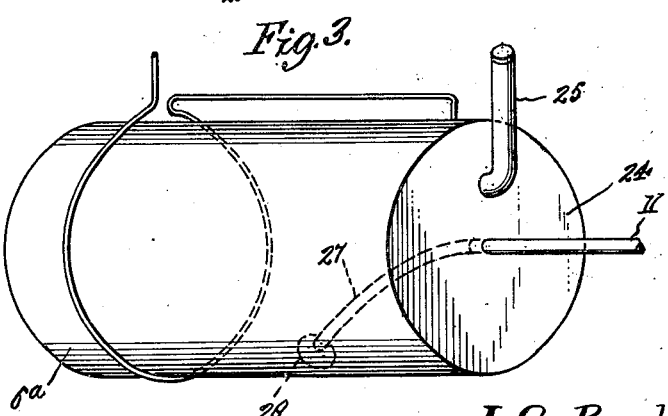
Figure 3 is a similar view showing a type of tank suitable for acrobatic flying.

Referring more particularly to Figure 3, the tank 6a is of a similar form, but in this connection the outlet line 11 terminates in a flexible end 27 within the tank carrying a weight 28 at its end portion to enable the open receiving mouth of the flexible pipe end 27 to always seek by gravity the lowest point in the tank 6a. Therefore no matter what the position of the plane substantially all of the liquid may be evacuated from the tank, which is particularly useful in acrobatic flying. The pipe end 27 may be a Duprene rubber hose and the weight 28 may be of soft lead.

Referring more particularly to Figure 4, the tank is represented at $6^b$ and the pump at $10^b$ with the outlet line at $11^b$ and the hose and weight at $27^b$ and $28^b$ respectively.

When using colored smoke it is advisable to have a return line 29 from the pump to the tank instead of by-passing the surplus liquid around the pump. The return to the pump level of the tank $6^b$ of the surplus liquid keeps the solution in the tank agitated, thereby preventing the pigment from settling to the bottom. At $12^b$ is shown the pipe line to the injection valve.

With certain types of pumps, having built-in by-passes, it may be necessary to close off the by-pass entirely and install a pressure relief valve below the pump as an independent unit.

The equipment

The principal equipment necessary for the production of smoke is a tank 6 to contain the chemical solution, an engine driven or wind driven pressure pump 10, a pressure regulating valve (unless such a valve is contained within the pump itself), a whistle valve which is used as an injection valve 13, and the correct length of exhaust pipe 14. A whistle valve appropriate for use are any of the valves shown in Patents 636,907; 1,252,232 and 1,530,691. These are merely examples of whistle valves that would serve in the present capacity. No doubt many other forms of whistle or other valves might be substituted and operated by the rods or pull cord represented at 15.

The material contained in the tank 6 for forming the smoke preferably consists of an aniline dye, a carbon-tetrachloride solvent, for instance pyrene liquid, and a vehicle, such as mineral oil, for carrying the said dye into the exhaust stream.

The preferred method of compounding is to mix a powdered aniline dye with carbon-tetrachloride until the dye is dissolved, and later only when the mixture is to be used, adding the mineral oil to convey the dye solution into the exhaust stream.

The carbon-tetrachloride serves two purposes; first, it acts as a solvent, and secondly, it raises the flash point of the solution to such a high degree that the solution as a whole becomes non-inflammable when injected into the exhaust system.

Mineral oil is especially adapted as a carrier because it is not consumed instantly and does not flare. The oil found useful is Texaco Carvis Oil having a viscosity of 5 to 8.

Formula for colored smoke (Use no sulphuric acid in the colored smoke.)

For each gallon of solution desired, put 1½ pounds of the powdered dye into a large glass bottle, such as the large bottles used for the transportation of acid.

Now pour into the bottle 1 quart of carbon-tetrachloride for each gallon of solution desired. (For example, if 5 gals. of solution is desired, put 7½ lbs. of dye and 5 qts. of carbon-tetrachloride into the bottle.)

Now seal the bottle in some manner and rock it in the fashion of a barrel churn until all the dye is dissolved. This will require about 30 minutes.

Do not mix the color with the oil carrier until just a few minutes before the plane is ready to take off.

To combine the color with the oil pour the contents of the bottle through three different sized wire seives, the first about 16 strands per inch (16 mesh), the second about 20 and the third not over 30 mesh. This will remove all lumps and foreign particles, which otherwise would only settle in the bottom of the tank and eventually cause trouble. You should now have about 5½ quarts of liquid. Pour this into 15 qts. of oil, which could be in any clean receptacle, protected as much as possible from the atmosphere to avoid evaporation of the carbon-tetrachloride.

This mixture should be stirred for at least 15 minutes in the same manner that a malted milk shake is stirred. This can be done with an electric drill and a piece of steel wire with a small loop in the end of it. The more the solution is stirred the better the color will be. If the solution is not used at once, keep it sealed until ready for use, then stir thoroughly again before pouring into the tank.

The tank should have a permanent drain installed at its lowest point so that all solution remaining in the tank after a flight can be drained immediately after landing in order to prevent its congealing. Then a small amount (perhaps 2 qts.) of carbon-tetrachloride should be put into the tank, the engine started, and the carbon-tetrachloride be allowed to run through the system, cleaning lines, pump, injection valve and jet. After the engine has cooled off the injection valve should be removed and inspected for dirt or carbon. Also inspect the jet and hot plate for carbon deposits.

If for any reason a flight is cancelled after the tank is filled with solution, it must be drained back in the bottle. If left in the tank overnight it will probably congeal and then the tank will have to be removed for cleaning with steam. The pump will not draw the solution out of the tank when it is in a congealed state.

The amount of dye may vary slightly according to the color. Also some of the colors may require slightly more carbon-tetrachloride than others for dissolving purposes.

Sulphuric acid tends to whiten the white smoke. However, it is not desired in the colored smoke solution because it has a tendency to bleach the colors. If sulphuric acid is used, for example, a red will appear as an orange.

The injection of 2 quarts per minute into the exhaust system should give a large volume of smoke, and the formula stated should provide excellent tinctorial strength. This is based upon an engine in a boat or airplane, developing about 150 H. P. at or near 2000 R. P. M. For the boat, it may be found that half this amount is sufficient. Or, it may require more.

It is obvious that various changes and modifications may be made in the details of construction and design of the above specifically described embodiment of this invention without departing from the spirit thereof, such changes and modifications being restricted only by the scope of the following claims.

What is claimed is:

1. In a device of the character described, an exhaust pipe, a plate in said exhaust pipe heated by the exhaust products passing therethrough, a jet disposed through said pipe angularly to said plate, and means for supplying under pressure to said jet a smoke-forming material.

2. In a device of the character described, an exhaust pipe, a plate mounted in said pipe in offset relation to the diameter of the pipe and heated by the exhaust products, and means on a side of the pipe nearer said plate for forcibly spraying against said plate a smoke-forming material to be entrained with the exhaust products.

3. In a device of the character described, an exhaust pipe, a substantially flat thin plate extending across the pipe in offset relation to a diameter thereof, a jet disposed angularly to said plate near one end on a side of the pipe nearer the plate, and means for supplying under pressure to said jet a smoke-forming material.

4. In a device of the character described, an exhaust pipe, a substantially thin, wide and long plate welded in said exhaust pipe with its edge presented to the hot products of combustion moving through said exhaust pipe, the plate extending traversely across the exhaust pipe offset from and substantially parallel to the horizontal diameter thereof, a jet communicating with the top side of the exhaust pipe above said plate and spaced closely to the forward end of the plate, said plate extending forwardly from the jet a distance substantially equal to one-half the diameter of the exhaust pipe, said plate extending to the rear of the jet substantially one and one-half times the diameter of the exhaust pipe, and means for furnishing to the jet under pressure a smoke-forming material for spraying forcibly and in restricted stream against said hot plate.

5. In a device of the character described, a vehicle, a tank on the vehicle for containing a smoke-forming material, a pump for withdrawing said material from the tank, a valve for receiving the material from the pump, a spray jet receiving the material under control of said valve, an exhaust pipe for receiving the material from said jet, and a hot plate in said exhaust pipe receiving the material from said jet and atomizing the same.

6. In a device of the character described, a self-propelled vehicle having an exhaust pipe, a hot atomizing plate in said exhaust pipe, a jet in angular relation to said plate, a valve adjoining said jet, a tank on the vehicle for containing a solution of smoke-forming materials, and a pump for circulating the material from the tank to the valve and jet for delivery to said plate.

7. In a system for smoke signaling, a tank for a material to produce smoke, a pump, a pipe removal line from the tank to the pump, a return line from the pump to the tank, and smoke-producing means in communication with the pump for receiving the material therefrom.

8. A composition of matter for use in visual smoke signals comprising an aniline dye, a carbon-tetrachloride solvent for the dye, and a vehicle to convey the dye into the exhaust stream.

9. A composition of matter for the uses mentioned comprising a powdered aniline dye, a carbon-tetrachloride solvent for said dye, and a mineral oil vehicle for carrying said dye into the exhaust stream.

10. The herein described method for preparing smoke for signaling purposes which consists in mixing a powdered aniline dye with carbon-tetrachloride, mixing the same to dissolve the dye, and later, at the time of use, mixing into said solution a mineral oil to convey the dye solution into the exhaust stream.

11. The herein described method which consists in mixing carbon-tetrachloride with an aniline dye, combining the dissolved dye with a suitable carrier to form a smoke forming compound, and projecting the compound under pressure in a restricted jet against a hot target wholly enclosed in an exhaust pipe.

12. The herein described method which consists in mixing carbon-tetrachloride with an aniline dye, combining the dissolved dye with a suitable mineral oil to form a smoke forming compound, and projecting the compound under pressure in a restricted jet against a hot target wholly enclosed in an exhaust pipe.

JOHN G. RANKIN.